United States Patent
Sun et al.

(10) Patent No.: US 12,462,482 B1
(45) Date of Patent: Nov. 4, 2025

(54) DIGITAL TWIN-BASED INTELLIGENT SLOPE MONITORING METHODS, SYSTEMS, AND STORAGE MEDIA

(71) Applicant: BEIJING MUNICIPAL ENGINEERING RESEARCH INSTITUTE, Beijing (CN)

(72) Inventors: Jinglai Sun, Beijing (CN); Hao Liu, Beijing (CN); Jun Yuan, Beijing (CN); Xinling Wang, Beijing (CN); Xun Xi, Beijing (CN); Yue Su, Beijing (CN); Hui Fang, Beijing (CN); Yang Zhou, Beijing (CN); Liwen Dong, Beijing (CN); Yafei Bai, Beijing (CN); Shengtao Shi, Beijing (CN)

(73) Assignee: BEIJING MUNICIPAL ENGINEERING RESEARCH INSTITUTE, Beijing (CN)

( * ) Notice: Subject to any disclaimer, the term of this patent is extended or adjusted under 35 U.S.C. 154(b) by 0 days.

(21) Appl. No.: 19/257,429

(22) Filed: Jul. 1, 2025

(30) Foreign Application Priority Data

Jan. 17, 2025 (CN) .......................... 202510073584.3

(51) Int. Cl.
   *G06T 17/00* (2006.01)
(52) U.S. Cl.
   CPC .................................... *G06T 17/00* (2013.01)
(58) Field of Classification Search
   None
   See application file for complete search history.

(56) References Cited

U.S. PATENT DOCUMENTS

| | | | |
|---|---|---|---|
| 2022/0130145 A1* | 4/2022 | Connary | G05D 1/101 |
| 2024/0070527 A1* | 2/2024 | Mukherjee | G06N 20/00 |

(Continued)

FOREIGN PATENT DOCUMENTS

| | | |
|---|---|---|
| CN | 117763969 A | 3/2024 |
| CN | 117828732 A | 4/2024 |

(Continued)

OTHER PUBLICATIONS

Liu et al., "Development of a slope digital twin for predicting temporal variation of rainfall-induced slope instability using past slope performance records and monitoring data," Engineering Geology 308 (2022): 106825 (Year: 2022).*

(Continued)

*Primary Examiner* — Anh-Tuan V Nguyen
(74) *Attorney, Agent, or Firm* — PORUS IP LLC

(57) ABSTRACT

A digital twin-based intelligent slope monitoring method, system, and storage medium are provided. The method includes obtaining point cloud data of a surface of a slope, creating a digital twin model; dividing the digital twin model to generate a plurality of first grids, calculating a displacement change value of each first grid during a target duration; defining the first grid with a displacement change value greater than a first threshold as a first region, dividing the target duration into a plurality of first durations with different lengths; setting a plurality of rainfall patterns, determining an optimal pattern for each first duration, calculating representative rainfall, constructing a prediction model, predicting representative rainfall for a future duration based on the optimal pattern and the representative rainfall of the first duration; generating a safety factor of the first region during the future duration based on the representative rainfall and a pore water pressure.

8 Claims, 3 Drawing Sheets

(56) References Cited

U.S. PATENT DOCUMENTS

2025/0020826 A1* 1/2025 Yu .......................... G08B 21/10
2025/0123421 A1* 4/2025 Zhang ..................... G01W 1/14

FOREIGN PATENT DOCUMENTS

| CN | 118247924 A | 6/2024 |
| JP | 2020106406 A | 7/2020 |
| JP | 2024027718 A | 3/2024 |
| KR | 101547070 B1 | 8/2015 |
| KR | 101580062 B1 | 12/2015 |

OTHER PUBLICATIONS

Notification to Grant Patent Right for Invention in Chinese Application No. 202510073584.3 mailed on Mar. 12, 2025, 5 pages.

\* cited by examiner

100

110
Obtaining first point cloud data of a surface of a slope at a past preset time point and creating a digital twin model based on the first point cloud data

120
Obtaining second point cloud data of the surface of the slope at a current time point, transforming the first point cloud data, the second point cloud data, and the digital twin model into a same coordinate system, performing, based on a preset size, a grid division on the digital twin model to generate a plurality of first grids, defining a duration between the past preset time point and the current time point as a target duration, calculating a displacement change value of each first grid among the plurality of first grids during the target duration, and displaying the displacement change value in the digital twin model

130
Defining the first grid with a displacement change value greater than a first threshold as a first region, obtaining an actual rainfall in the first region during the target duration, establishing a first coordinate system with time as a horizontal axis and the actual rainfall as a vertical axis, plotting a first change curve of the actual rainfall over time in the first coordinate system, obtaining one or more extreme points of the first change curve, defining a time point corresponding to each extreme point as a first time point, and dividing the target duration into a plurality of first durations with different lengths based on the one or more first time points corresponding to the one or more extreme points

140
For each first duration of the plurality of first durations, setting a plurality of rainfall patterns, each rainfall pattern corresponding to a plurality of pieces of historical rainfall data, determining a rainfall pattern from the plurality of rainfall patterns as an optimal pattern based on the actual rainfall during the first duration, obtaining an optimal time point within the first duration based on the optimal pattern and the plurality of pieces of historical rainfall data, designating the actual rainfall at the optimal time point as a representative rainfall during the first duration , constructing a prediction model based on the historical rainfall data, predicting an optimal pattern and a representative rainfall for a future duration based on the optimal pattern and representative rainfall of each first duration, and defining the representative rainfall during the future duration as a predicted rainfall

150
Obtaining a historical rainfall during the target duration, obtaining a first pore water pressure distribution of soil in the first region based on the historical rainfall, generating a first safety factor of the first region during the future duration based on the predicted rainfall and the first pore water pressure distribution, designating an average of all first safety factors of the slope as a final safety factor of the slope, and displaying the final safety factor of the slope in the digital twin model

FIG. 1

DIGITAL TWIN-BASED INTELLIGENT SLOPE MONITORING METHODS, SYSTEMS, AND STORAGE MEDIA

CROSS-REFERENCE TO RELATED APPLICATIONS

This application claims priority to Chinese Patent Application No. 202510073584.3, filed on Jan. 17, 2025, the entire contents of which are incorporated herein by reference.

TECHNICAL FIELD

The present disclosure relates to the field of digital twin technology, and in particular, to digital twin-based intelligent slope monitoring methods, systems, and storage media.

BACKGROUND

Intelligent monitoring using digital twin technology is an emerging approach in slope engineering. The approach integrates advanced sensor technology, data acquisition technology, data processing technology, and numerical simulation technology, which improves the accuracy and real-time performance of slope stability assessment.

For example, a Chinese patent application with a publication No. CN117763969A discloses a digital twinning-based slope monitoring method, device, and storage medium. The method includes obtaining a monitoring dataset acquired by a plurality of types of sensors installed on a slope to be monitored, performing a sensitivity analysis on monitoring data in the monitoring dataset and screening a sensitive dataset that satisfies a predetermined sensitivity; inputting the sensitive dataset into a preconstructed digital twin model to obtain an inversion dataset of the slope to be monitored; performing a fusion process on the inversion dataset to obtain a comprehensive monitoring information curve of the slope to be monitored; and determining a state of the slope to be monitored based on an inclination angel of the comprehensive monitoring information curve.

As another example, a Chinese patent application with a publication No. CN117828732A discloses a digital twinning-based slope stability determining method, system, medium, and a terminal, relates to the technical fields of digital twin and ionic rare earth ores, and mainly aims to prevent a change in the stress distribution of a mine slope caused by the injection of liquid leaching agents into the ore body, thereby avoiding potential impacts on the stability of the mine slope. The method includes receiving a determining instruction corresponding to stability parameters of a target mine slope, the determining instruction carrying a target moment; determining groundwater level data of the target mine slope at the target moment from temporal distribution data of a hydraulic potential field of the target mine slope; and performing three-dimensional slope stability analysis using a strength reduction method based on the groundwater level data to obtain a mine slope stability prediction result of the target mine slope at the target moment.

However, the above disclosures for intelligent slope monitoring do not fully integrate the effects of a plurality of factors (e.g., a displacement variation, a weather condition, a soil property, etc.) on slope stability, thereby limiting the ability of the monitoring system to comprehensively assess the stability of the slope.

Therefore, it is desired to provide a digital twin-based intelligent slope monitoring method, system, and storage medium. The slope stability under a future rainfall condition is predicted by creating an accurate digital twin model of a slope to consider effects of a plurality of factors on the slope stability, enabling the implementation of preventive measures in advance to mitigate disasters such as landslides and mudslides.

SUMMARY

One or more embodiments of the present disclosure provide a digital twin-based intelligent slope monitoring method. The method may include obtaining first point cloud data of a surface of a slope at a past preset time point and creating a digital twin model based on the first point cloud data; obtaining second point cloud data of the surface of the slope at a current time point, transforming the first point cloud data, the second point cloud data, and the digital twin model into a same coordinate system, performing, based on a preset size, a grid division on the digital twin model to generate a plurality of first grids, defining a duration between the past preset time point and the current time point as a target duration, calculating a displacement change value of each first grid among the plurality of first grids during the target duration, and displaying the displacement change value in the digital twin model; defining the first grid with a displacement change value greater than a first threshold as a first region, obtaining an actual rainfall in the first region during the target duration, establishing a first coordinate system with time as a horizontal axis and the actual rainfall as a vertical axis, plotting a first change curve of the actual rainfall over time in the first coordinate system, obtaining one or more extreme points of the first change curve, defining a time point corresponding to each extreme point as a first time point, and dividing the target duration into a plurality of first durations with different lengths based on the one or more first time points corresponding to the one or more extreme points; for each first duration of the plurality of first durations, setting a plurality of rainfall patterns, each rainfall pattern corresponding to a plurality of pieces of historical rainfall data, determining a rainfall pattern from the plurality of rainfall patterns as an optimal pattern based on the actual rainfall during the first duration, obtaining an optimal time point within the first duration based on the optimal pattern and the plurality of pieces of historical rainfall data, designating the actual rainfall at the optimal time point as a representative rainfall during the first duration, constructing a prediction model based on the historical rainfall data, predicting an optimal pattern and a representative rainfall for a future duration based on the optimal pattern and representative rainfall of the first duration, and defining the representative rainfall during the future duration as a predicted rainfall; and obtaining a historical rainfall during the target duration, obtaining a first pore water pressure distribution of soil in the first region based on the historical rainfall, generating a first safety factor of the first region during the future duration based on the predicted rainfall and the first pore water pressure distribution, designating an average of all first safety factors of the slope as a final safety factor of the slope, and displaying the final safety factor of the slope in the digital twin model.

One or more embodiments of the present disclosure provide a digital twin-based intelligent slope monitoring system for implementing the digital twin-based intelligent slope monitoring method described above. The system may include a creation module, a calculation module, a division module, a prediction module, and a monitoring module. The creation module may be configured to obtain first point cloud data of a surface of a slope at a past preset time point and create a digital twin model based on the first point cloud data. The calculation module may be configured to obtain second point cloud data of the surface of the slope at a current time point, transform the first point cloud data, the second point cloud data, and the digital twin model into a same coordinate system, perform, based on a preset size, a grid division on the digital twin model to generate a plurality of first grids, define a duration between the past preset time point and the current time point as a target duration, calculate a displacement change value of each first grid among the plurality of first grids during the target duration, and display the displacement change value in the digital twin model. The division module may be configured to define a first grid with a displacement change value greater than a first threshold as a first region, obtain an actual rainfall in the first region during the target duration, establish a first coordinate system with time as a horizontal axis and the actual rainfall as a vertical axis, plot a first change curve of the actual rainfall over time in the first coordinate system, obtain one or more extreme points of the first change curve, define a time point corresponding to each extreme point as a first time point, and divide the target duration into a plurality of first durations with different lengths based on the one or more first time points corresponding to the one or more extreme points. The prediction module may be configured to, for each first duration of the plurality of first durations, set a plurality of rainfall patterns, each rainfall pattern corresponding to a plurality of pieces of historical rainfall data, determine a rainfall pattern from the plurality of rainfall patterns as an optimal pattern based on the actual rainfall during the first duration, obtain an optimal time point within the first duration based on the optimal pattern and the plurality of pieces of historical rainfall data, designate the actual rainfall at the optimal time point as a representative rainfall during the first duration, construct a prediction model based on the historical rainfall data, predict an optimal pattern and a representative rainfall for a future duration based on the optimal pattern and representative rainfall of the first duration, and define the representative rainfall during the future duration as a predicted rainfall. The monitoring module may be configured to obtain a historical rainfall during the target duration, obtain a first pore water pressure distribution of soil in the first region based on the historical rainfall, generate a first safety factor of the first region during the future duration based on the predicted rainfall and the first pore water pressure distribution, designate an average of all first safety factors of a slope as a final safety factor of the slope, and display the final safety factor of the slope in the digital twin model.

One or more embodiments of the present disclosure further provide a non-transitory computer storage medium storing program instructions. The program instructions, when executed, may control the non-transitory computer storage medium to perform the digital twin-based intelligent slope monitoring method.

The embodiments of the present disclosure include but are not limited to the following beneficial effects.

By obtaining the first point cloud data at the past preset time point, an accurate digital twin model of the slope is created, which is capable of reflecting in detail an initial state of the slope and providing an accurate basis for subsequent analysis and prediction. By performing a grid division on the digital twin model to generate a plurality of first grids and calculating the displacement change of the slope in each first grid from the past preset time point to the current time point, the displacement change of the slope in each local region is analyzed in more detail. The first grid with a displacement change value greater than the preset threshold is defined as the first region. The present disclosure focuses on the first region with a greater hidden danger of landslide or stronger instability, and the rainfall of the first region is analyzed and predicted.

Embodiments of the present disclosure also divide the target duration into a plurality of first durations with different lengths, match each first duration with a corresponding rainfall pattern, where each rainfall pattern includes a plurality of pieces of historical rainfall data. The prediction model is constructed based on the rainfall data, the prediction model being a neural network model. A historical duration where each piece of historical rainfall data is located into a plurality of first durations. The neural network model learns to assign the optimal pattern to each first duration and calculates the representative rainfall under the optimal pattern. The neural network model learns a rainfall change trend under each rainfall pattern corresponding to each first duration within the historical duration, and predicts and generates the optimal rainfall pattern and the predicted rainfall for the future duration, thus improving the prediction accuracy of the future rainfall trend. The first pore water pressure distribution of the slope soil in the first region of the future duration is determined based on the predicted rainfall in the future duration and the historical rainfall in the target duration, and the first safety factor of the slope soil is obtained based on the first pore water pressure distribution, so that preventive measures may be taken in advance by predicting the slop stability under the future rainfall conditions, thus reducing disasters such as landslides and mudslides.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein:

FIG. 1 is a flowchart illustrating an exemplary digital twin-based intelligent slope monitoring process according to some embodiments of the present disclosure;

DETAILED DESCRIPTION

Figure 2:
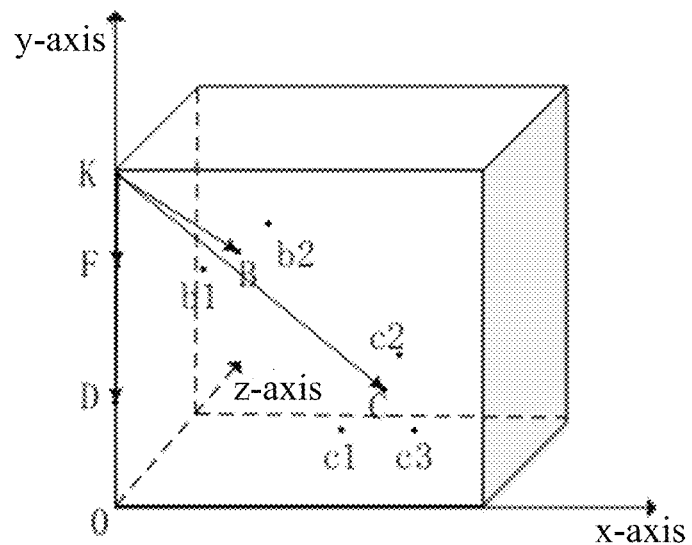
FIG. 2 is a schematic diagram illustrating an exemplary first grid according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise", "comprises", "comprising", "include", "includes", and/or "including", merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

It will be appreciated that the terms "first", "second", or the like, as used herein, may be used to describe various components, but unless otherwise noted, these components are not limited by these terms. These terms are used only to distinguish the first element from another element. For example, without departing from the scope of the present application, the first xx script may be referred to as the second xx script, and similarly, the second xx script may be referred to as the first xx script.

FIG. 1 is a flowchart illustrating an exemplary digital twin-based intelligent slope monitoring process according to some embodiments of the present disclosure.

As shown in FIG. 1, process 100 includes the following operations. In some embodiments, the process 100 may be performed by a digital twin-based intelligent slope monitoring system or a processor.

The processor may process data and/or information obtained from components of other devices or systems. The processor may execute program instructions based on the data, information, and/or processing results to perform one or more functions described in the embodiments of the present disclosure. In some embodiments, the processor may include one or more sub-processing devices (e.g., a single-core processing device or a multi-core and multi-chip processing device). Merely by way of example, the processor may include, but is not limited to, a central processing unit (CPU), a microprocessor MCU, or the like, or any combination thereof. In some embodiments, the processor may include a plurality of modules, and different modules may be configured to execute separate program instructions.

In 110, first point cloud data of a surface of a slope at a past preset time point is obtained, and a digital twin model is created based on the first point cloud data. The operation 110 may be performed by a creation module or the processor.

The past preset time point refers to a specific historical time point that is preset by a user based on monitoring requirements. For example, the past preset time point may be 0:00 a.m. on the same day, 12:00 a.m. on the previous day, or the like.

The first point cloud data refers to historical point cloud data of the surface of a slope collected at the past preset time point. In some embodiments, a slope includes, but is not limited to, a natural slope, a clay slope, a coastal or riverbank slope, or the like.

In some embodiments, the processor may obtain point cloud data (e.g., the first point cloud data) of the surface of the slope at the past preset time point (e.g., 0:00 a.m.) using a scanning device (e.g., a three-dimensional (3D) laser scanner or a scanning radar of a drone). The scanning device may scan to obtain the point cloud data of the surface of the slope and store the point cloud data in a memory. The processor may retrieve the first point cloud data at the past preset time point from the memory.

In some embodiments, in order to clearly monitor the displacement change and slope stability, the processor first needs to create the digital twin model of the slope based on three-dimensional point cloud data of the slope to obtain an entire region range of the entire slope, which in turn allows for analyzing the displacement change of the slope.

The digital twin model refers to a real-time dynamic mirror model for creating the slope in a virtual space through digitization technology. The digital twin model enables simulation, prediction, and optimization through data driven.

In some embodiments, the processor may preprocess the first point cloud data, convert the processed first point cloud data into a 3D model using 3D modeling software (e.g., AutoCAD), extract a key geological feature (e.g., a structural surface, a crack, a slope gradient, etc.) of the slope from the 3D model, and finally integrate multi-source data (including the point cloud data, the 3D model, and the key geological feature, etc.) to construct the digital twin model. The preprocessing includes noise removal, filtering, data alignment, etc.

In 120, second point cloud data of the surface of the slope at a current time point is obtained, the first point cloud data, the second point cloud data, and the digital twin model are transformed into the same coordinate system, based on a preset size, a grid division is performed on the digital twin model to generate a plurality of first grids, a duration between the past preset time point and the current time point is defined as a target duration, a displacement change value of each first grid among the plurality of first grids during the target duration is calculated, and the displacement change value is displayed in the digital twin model. The operation 120 may be performed by a calculation module or the processor.

The second point cloud data refers to real-time point cloud data collected at the current time point on the surface of the slope. The second point cloud data may be obtained by scanning with the scanning device.

The preset size refers to the size of a grid unit that is preset when dividing the digital twin model. For example, if the preset size is 1 m×1 m, it is indicated that the slope model is divided into a plurality of grids of 1 m×1 m size.

The first grid refers to a base grid unit that is generated after dividing the digital twin model based on the preset size.

The displacement change value refers to the amount of displacement of the first grid during the target duration.

In some embodiments, the processor may perform a coordinate transformation operation, such as translating, rotating, and scaling, on the first point cloud data and the second point cloud data of the surface of the slope. The processor aligns the coordinates of the first point cloud data, the second point cloud data, and the digital twin model to ensure the coordinates are in the same coordinate system. To calculate slope displacement changes more accurately, the processor may divide the digital twin model according to the preset size (e.g., 2 m×2 m). The dividing of grids allows the slope to be divided into smaller sections, and each first grid may represent a small piece of the slope. The displacement of the first grid may be calculated independently, and the processor may calculate the displacement change value of each first grid during the target duration, which is ultimately displayed in the digital twin model.

In some embodiments, for each first grid among the plurality of first grids, the processor may calculate the displacement change value by defining a first node of the first grid in a coordinate system, determining a first coordinate of the first point cloud data and a second coordinate of the second point cloud data; determining a first vector based on the first node and the first coordinate, and determining the second vector based on the second node and the second coordinate; calculating a difference between the first vector and the second vector in a normal direction and determining the difference as the displacement change value.

The first node refers to a randomly defined coordinate point in the coordinate system within the first grid. For example, the first node may be a vertex of the first grid. The first coordinate refers to a position coordinate of a single piece of first point cloud data or a centroid coordinate of a plurality of pieces of first point cloud data. The second coordinate refers to a position coordinate of a single piece of second point cloud data, or a centroid coordinate of a plurality of pieces of second point cloud data. The first vector refers to a vector connecting the first node and the first coordinate. The second vector refers to a vector connecting the second node and the second coordinate. The normal direction may represent a vertical direction of the slope, e.g., the y-axis of a vertical coordinate system.

In some embodiments, calculating the displacement change value of each first grid among the plurality of first grids includes defining a vertex of the first grid in the digital twin model as the first node, and defining a transformed three-dimensional position coordinate of the first point cloud data and a transformed three-dimensional position coordinate of the second point cloud data as a first position coordinate and a second position coordinate, respectively; obtaining a first quantity of the first point cloud data and a second quantity of the second point cloud data within the first grid; in response to determining that the first quantity and the second quantity are both less than or equal to 1, defining a first vector with the first node as a starting point and the first position coordinate of the first point cloud data as an endpoint, and defining a second vector with the first node as the starting point and the second position coordinate of the second point cloud data as an endpoint; in response to determining that the first quantity is greater than 1, calculating a centroid coordinate of all first point cloud data within the first grid, and designating a vector with the first node as the starting point and the centroid coordinate of the first point cloud data as the endpoint as the first vector; in response to determining that the second quantity is greater than 1, calculating a centroid coordinate of all second point cloud data within the first grid, and designating a vector with the first node as the starting point and the centroid coordinates of the second point cloud data as an endpoint as the second vector; and obtaining a unit vector $r_i$ of the first grid in the normal direction, calculating a first component $u_1$ and a second component $u_2$ of the first vector and the second vector in the normal direction based on a first equation and a second equation, respectively; and defining a difference between the first component and the second component as the displacement change value of the first grid.

In some embodiments, the first equation is $u_1=(d_1 \cdot r_i)r_i$, and the second equation is $u_2=(d_2 \cdot r_i)r_i$. $d_1$ and $d_2$ denote the first vector and the second vector, respectively.

FIG. 2 is a schematic diagram illustrating an exemplary first grid according to some embodiments of the present disclosure.

In some embodiments, as shown in FIG. 2, the processor may define the point K in the first grid as the first node, and b1, b2, c1, c2, and c3 exist in the first grid, b1 and b2 are first point cloud data and c1, c2, and c3 are second point cloud data. Because the count of both the first point cloud data and the second point cloud data is greater than 1, the processor may calculate to obtain the centroid coordinates, point B, of b1 and b2, and the centroid coordinates, point C, of c1, c2, and c3. Connecting the point K and the point B as a first vector $\overrightarrow{KB}$ and the coordinates of the point K and the point C as a second vector $\overrightarrow{KC}$, the processor may calculate a first component $\overrightarrow{KF}$ of the first vector in the normal direction and a second component $\overrightarrow{KD}$ of the second vector in the normal direction. The difference $\overrightarrow{FD}$ between the first component and the second component may be designated as the displacement change value of the first grid.

In some embodiments of the present disclosure, a displacement of the first grid in the vertical direction of the slope at different time points is obtained by calculating components of the first vector and the second vector in the normal direction. By focusing on the normal component only, the displacement of the first grid in the vertical direction of the slope at different time points may reduce the error caused by a terrain undulation, a measurement error, or data noise, thereby improving the accuracy of displacement measurement.

In 130, the first grid with a displacement change value greater than a first threshold is defined as a first region, an actual rainfall in the first region during the target duration is obtained, a first coordinate system with time as a horizontal axis and the actual rainfall as a vertical axis is established, a first change curve of the actual rainfall over time in the first coordinate system is plotted, one or more extreme points of the first change curve are obtained, a time point corresponding to each extreme point is defined as a first time point, and the target duration is divided into a plurality of first durations with different lengths based on the one or more first time points corresponding to the one or more extreme points. The operation 130 may be performed by a division module or the processor.

The first threshold refers to a critical value used to determine whether the slope grid is a high-risk region. The first threshold may be set by a specialized technician based on the actual situation of the slope.

The first region refers to a grid region where the displacement change value in the slope is large, instability is high, and phenomena such as landslides are likely to occur.

Important factors in the generation of landslides in the first region include, for example, rainfall in the region. For example, heavy or sustained rainfall increases the pore water pressure of the soil and reduces the shear strength of the soil, thereby increasing the risk of landslides.

The first coordinate system refers to a two-dimensional right-angled coordinate system used to analyze the rainfall over time.

The first change curve refers to a time series curve drawn based on actual rainfall data of the first region, which is used to visualize the change feature of the actual rainfall over time in the first region within a rainfall duration.

The extreme point refers to a point in the first change curve that has a greater or lesser value than all other points in the neighborhood. The extreme point may include both a maximum point and a minimum point. The first duration refers to a plurality of time durations divided from the target duration based on the extreme points of the first change curve.

In some embodiments, the processor may obtain the actual rainfall in the first region through a rain gauge, a weather radar, a satellite remote sensor, or meteorological monitoring data from a weather station, etc., and further analyze and predict the slope stability based on the actual rainfall.

Figure 3:
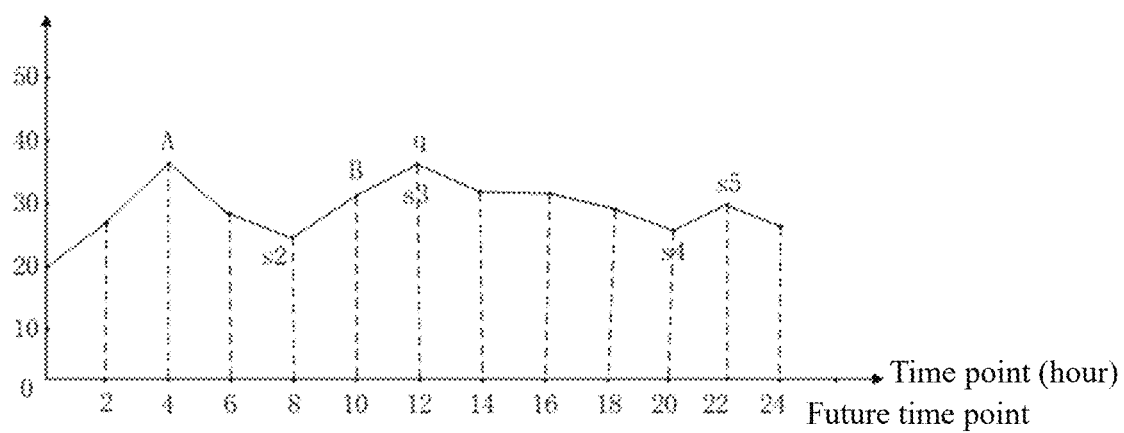
FIG. 3 is a schematic diagram illustrating an exemplary first change curve according to some embodiments of the present disclosure.

FIG. 3 is a schematic diagram illustrating an exemplary first change curve according to some embodiments of the present disclosure.

In some embodiments, as shown in FIG. 3, by obtaining the extreme points (e.g., s1, s2, s3, s4, s5, etc.) in the first change curve, the processor may divide one day into a plurality of first durations with different lengths, e.g., 0-4 h, 4-8 h, 12-20 h, 20-22 h, 22-24 h.

In 140, for each first duration of the plurality of first durations, a plurality of rainfall patterns are set, each rainfall pattern corresponding to a plurality of pieces of historical rainfall data, a rainfall pattern from the plurality of rainfall patterns is determined as an optimal pattern based on the actual rainfall during the first duration, an optimal time point within the first duration is obtained based on the optimal pattern and the plurality of pieces of historical rainfall data, the actual rainfall at the optimal time point is designated as a representative rainfall during the first duration, a prediction model is constructed based on the historical rainfall data, an optimal pattern and a representative rainfall for a future duration is predicted based on the optimal pattern and representative rainfall of the first duration, and the representative rainfall during the future duration is defined as a predicted rainfall. The operation 140 may be performed by a prediction module or the processor.

The rainfall pattern refers to a preset rainfall type. The rainfall pattern includes, but is not limited to, a long-term heavy rainfall pattern (a first pattern), a long-term weak rainfall pattern (a second pattern), a short-term heavy rainfall pattern (a third pattern), and a short-term weak rainfall pattern (a fourth pattern).

In some embodiments, the processor may obtain the rainfall pattern based on a trend of rainfall variation on the slope during the historical duration. For example, the processor may extract a key rainfall feature from the trend of rainfall variation during the historical duration to define the plurality of rainfall patterns. The key rainfall feature may include a rainfall intensity, rainfall time, a rainfall interval, a rainfall peak, or the like.

In some embodiments, the processor may determine a count of rainfall patterns. The processor may extract a steep edge distribution and a catchment area distribution of the slope from the digital twin model and determine the count of rainfall patterns based on the steep edge distribution and the catchment area distribution.

The steep edge distribution refers to a distribution of a plurality of steep edges. A steep edge refer to an edge with a slope gradient greater than a slope gradient threshold.

The catchment area distribution refers to a distribution of the catchment area. The catchment area refers to a geographic region extent within a given region where the surface runoff formed by rainfall eventually converges to a drainage point or slope profile. The catchment area determines the amount of water flow that may be induced by the rainfall and potential hydrologic loads. In some embodiments, the catchment area distribution may include sizes of a plurality of catchment areas.

In some embodiments, the processor may extract the steep edge distribution and the catchment area distribution directly from the digital twin model. For example, the processor may extract all the steep edges from the digital twin model to form the steep edge distribution and extract the catchment area to generate the catchment area distribution.

In some embodiments, the processor may determine a variance of slope gradients of all the steep edges and a variance of all the catchment areas. Further, the processor may normalize the variance of the slope gradients of the steep edges and the variance of the catchment areas, and then perform a weighted sum of them. The processor may determine the count of rainfall patterns based on the weighted sum. The count of rainfall patterns is positively correlated with the weighted sum. For example, the processor may determine the count of rainfall patterns based on the weighted sum through a pattern count preset table. The pattern count preset table may include weighted sums and a count of rainfall patterns corresponding to each weighted sum.

The variance of the slope gradients of the steep edges reflects a difference in the steep edge distribution. For example, a region with dense steep edges needs to be covered with short duration heavy rainfall (which may trigger a landslide), whereas in a region with sparse steep edges, different regions require different rainfall patterns due to differences in the steep edge distribution. The same logic applies to the catchment area. For example, a region with a large catchment area needs to be covered for sustained moderate rainfall (which may lead to ponding and dam failure). The greater the variance of the slope gradients of the steep edges and the greater the variance of the catchment area, the greater the complexity of the slope. Therefore, in some embodiments of the present disclosure, the count of rainfall patterns is determined by the variance of the slope gradients of the steep edges and the variance of the catchment area, which provides a more comprehensive coverage of the risky scenario and adapts to changes dynamically.

The optimal pattern refers to a rainfall pattern determined to best match the first duration. The optimal pattern may represent a rainfall feature of the first region during the first duration, thus historical data corresponding to the optimal pattern is retrieved for prediction.

In some embodiments, for each first duration of the plurality of first durations, the processor determines the rainfall pattern that most closely matches the rainfall pattern during the first duration from the plurality of rainfall patterns as the optimal pattern corresponding to the first duration, thus the change in the rainfall pattern during the target duration may be obtained, thereby constructing the prediction model.

In some embodiments, determining the rainfall pattern from the rainfall patterns as the optimal pattern includes calculating an average of actual rainfalls at a plurality of first time points on the first change curve; in response to determining that the first duration is greater than a second threshold, the average is greater than a third threshold, and the first time points are maximum points, matching the optimal pattern as a first pattern; in response to determining that the first duration is greater than the second threshold, the average is less than the third threshold, and the first time points are minimum points, matching the optimal pattern as a second pattern; in response to determining that the first duration is less than the second threshold, the average is greater than the third threshold, and the first time points are maximum points, matching the optimal pattern as a third pattern; and in response to determining that the first duration is less than the second threshold, the average is less than the third threshold, and the first time points are minimum points, matching the optimal pattern as a fourth pattern.

The second threshold refers to a time length threshold for determining the length of the first duration.

The third threshold refers to a rainfall intensity threshold used to determine the average of the actual rainfall during the first duration.

In some embodiments, as shown in FIG. 3, the actual rainfalls at the first time points of 0:30, 1:00, 1:30, 2:00, 2:30, 3:00, 3:30, and 4:00 are obtained at 30-minute intervals, which are 22, 24, 26, 28, 30, 34, 36, 38, respectively. The average of the actual rainfalls for the first duration 0-4 h is therefore 29.75. Assuming that the second threshold is 2 hours and the third threshold is 25, because the first duration is 4 h, which is greater than the second threshold, and the first time points at 4 h are the maximum points, the average of 29.75 is greater than the third threshold, then the processor may determine an optimal prediction mode of the first duration 0-s1 is the first pattern, i.e., the long-term heavy rainfall pattern. According to this approach, it is possible to obtain the rainfall pattern during each first duration, and the rainfall pattern in the first duration 4-8 h is the second pattern, i.e., the long-term weak rainfall pattern; the rainfall pattern in the first duration 8-12 h is the first pattern, i.e., the long-term heavy rainfall pattern; the rainfall pattern in the first duration 12-20 h is the second mode, i.e., the long-term weak rainfall pattern; and the rainfall pattern in the first duration 20-22 h is the third pattern, i.e., the short-term heavy rainfall pattern.

In the embodiments of the present disclosure, the third threshold and a fourth threshold allow for accurately determining the optimal pattern that best matches the first duration, thus accurately predicting rainfall during the future duration.

The optimal time point refers to a time point where the difference between the actual rainfall and the historical average rainfall corresponding to the optimal pattern is minimized during the first duration. For example, if the difference between the actual rainfall during the first duration and the historical average rainfall at time point t is smaller than and equal to the fourth threshold, then t is defined as the optimal time point, and the rainfall at the time point t is designated as the representative rainfall during the first duration.

In some embodiments, obtaining the optimal time point within each first duration includes obtaining an average rainfall of the plurality of pieces of historical rainfall data corresponding to the optimal pattern at the first time points; and calculating a difference between the actual rainfall at each first time point and the average rainfall and defining a time point where the difference is less than or equal to the fourth threshold as the optimal time point.

The fourth threshold refers to a threshold used to determine the difference between the actual rainfall and the historical average rainfall.

In some embodiments, the processor may obtain the average rainfall of the optimal pattern corresponding to the first duration 0-4 h at the first time points. For example, in the long-term heavy rainfall pattern, the first time points include 0:30, 1:00, 1:30, 2:00, 2:30, 3:00, 3:30, 4:00, and the processor may obtain the average rainfall at these first time points, which are 25, 26, 27, 28, 29, 30, 31, and 33, respectively. The processor may calculate the difference between the average rainfall at each first time point and the actual rainfall. For example, the difference at the first time point 2:00 is obtained to be 0 by calculation, which is less than or equal to the fourth threshold of 0, the time point of 2:00 may be defined as the optimal time point. The rainfall with the highest accuracy and the smallest error may be obtained as the representative rainfall by determining the optimal time point.

In some embodiments of the present disclosure, the representative rainfall is made more reliable by calculating the difference between the actual rainfall and the average rainfall in the optimal pattern and filtering the optimal time point with the fourth threshold. Based on this benchmark, the input accuracy of the prediction model is improved, noise interference is reduced, the prediction accuracy of complex rainfall patterns is enhanced, and the prediction accuracy of future rainfall events is improved.

The representative rainfall refers to the actual rainfall corresponding to the optimal time point.

The future duration refers to the target duration for predicting slope stability. A starting point of the future duration is the current time point, and an end point is set by the professional technician according to monitoring requirements.

The predicted rainfall refers to the representative rainfall for each first duration during the future duration generated by the prediction model.

In some embodiments, the optimal pattern for each first duration within the target duration, as well as the average rainfall of the optimal pattern, are input into the prediction model, and the processor may obtain the predicted rainfall in the future duration. In some embodiments of the present disclosure, dividing the target duration into a plurality of first durations with different lengths allows for a more fine-grained analysis of the rainfall at each stage within the target duration. Because the trend of the rainfall variation is different for each duration with different lengths, the processor may match a corresponding rainfall pattern for each first duration with different lengths based on the trend of the rainfall variation.

In some embodiments, the prediction model is a machine learning model. For example, the prediction model may be a neural network model, a recurrent neural network (RNN) model, etc.

In some embodiments, an input of the prediction model may include the optimal pattern and the representative rainfall corresponding to the first duration, and an output of the prediction model may include the optimal pattern and the representative rainfall (i.e., the predicted rainfall) during the future duration.

In some embodiments, the prediction model may be obtained by training based on historical rainfall data. In some embodiments, the processor may obtain a plurality of first training samples with first labels to constitute a first training sample set.

The first training samples may include optimal patterns and representative rainfall corresponding to a plurality of historical first durations in the historical rainfall data. The first labels may be the optimal pattern and the representative rainfall during the future duration corresponding to the first training samples. The processor may designate the optimal pattern and the representative rainfall for a subsequent first duration of the historical first duration corresponding to the first training sample as the first label corresponding to the first training sample.

In some embodiments, constructing the prediction model includes for each piece of historical rainfall data, defining a time period where the piece of historical rainfall data is located as a historical duration, dividing the historical duration into a plurality of first durations (i.e., the historical first duration), matching a corresponding optimal pattern for each first duration, and calculating the representative rainfall under the optimal pattern; determining a division point within the historical duration, designating the optimal pattern and the representative rainfall of each first duration within the time period before the division point as input features, selecting one first duration after the division point, and designating the corresponding optimal pattern and the representative rainfall of the first duration after the division point as output features, repeating the operations on each historical rainfall data to construct a neural network model, and obtaining prediction model by training the neural network model based on the input features and the output features of each piece of historical rainfall data.

In some embodiments, based on a manner of dividing the first duration within the target duration and a manner of matching the optimal pattern for each first duration and calculating the representative rainfall, each historical duration (including the target duration, which may be a plurality of days of rainfall data) is divided into the plurality of first durations, a point is selected in a time series of the historical duration, and the historical rainfall data is divided into two portions, i.e., before the division point and after the division point. The division point is used to distinguish between model training data and model validation data. Optimal patterns and representative rainfall for all first durations before the division point are designated as the input features (i.e., feature sets), and rainfall patterns and representative rainfall for first one of first durations after the division point are designated as the output features (i.e., target values), and the input features and the output features are used to train the neural network model to enable the neural network model to predict the optimal pattern and the representative rainfall during the future duration based on the historical rainfall data. Through a plurality of iterations, model parameters are adjusted. After training, the neural network model can capture time-series features and patterns of the rainfall data, so that the optimal pattern and the representative rainfall in the future duration may be predicted, and a pore water pressure distribution of soil in the future duration is obtained in advance based on the representative rainfall in the future duration to further analyze the slope stability.

In some embodiments, the processor may input the first training sample set into an initial prediction model to perform a plurality of rounds of iterations. Each round of iteration includes selecting one or more first training samples from the first training sample set, inputting the one or more first training samples into the initial prediction model, obtaining one or more model prediction outputs corresponding to the one or more first training samples; substituting one or more model prediction outputs and first labels of the one or more first training samples into a formula of a predefined loss function to calculate the value of the loss function; inversely updating model parameters of the initial prediction model based on the value of the loss function. When an iteration end condition is satisfied, the iteration is ended, and a trained prediction model is obtained. The iteration end condition may be that the loss function converges, the number of iterations reaches a threshold, etc.

In some embodiments of the present disclosure, by matching the corresponding rainfall pattern for the plurality of first durations within the target duration, calculating the corresponding representative rainfall, and predicting the rainfall pattern and the representative rainfall in the future duration using the prediction model, countermeasures may be taken in advance.

In 150, a historical rainfall during the target duration is obtained, a first pore water pressure distribution of soil in the first region is obtained based on the historical rainfall, a first safety factor of the first region during the future duration is generated based on the predicted rainfall and the first pore water pressure distribution, an average of all first safety factors of the slope is designated as a final safety factor of the slope, and the final safety factor of the slope is displayed in the digital twin model. The operation 150 may be performed by a monitoring module or the processor.

The first pore water pressure distribution refers to a pressure distribution exerted by water in soil pores in the first region.

The first safety factor refers to a safety factor corresponding to the first region, which may reflect the local slope stability. The higher the safety factor, the more stable the slope.

The final safety factor refers to the first safety factor corresponding to all slopes, which may represent the overall slope stability.

In some embodiments, for each first region, the processor may determine the first safety factor of the first region. The processor may average the first safety factors corresponding to all the first regions of the slope as the final safety factor.

In some embodiments, the processor may determine the first safety factor of the first region in a plurality of ways.

In some embodiments, the processor may determine the first pore water pressure distribution based on a first absorption capacity of the soil in the first region.

If there exists a long period without rainfall before the current rainfall, the soil is judged to be in a dry state, and inversely, the soil is in a wet state.

In some embodiments, the processor may obtain the first absorption capacity of the soil in the first region, the first absorption capacity being a maximum value of water absorbed by the soil in the dry state. In response to determining that the soil is in the dry state, the processor obtains an initial pore water pressure distribution of the first region in the dry state based on a one-dimensional infiltration model in combination with the first absorption capacity and determines the initial pore water pressure distribution as the first pore water pressure distribution.

In some embodiments, in response to determining that the historical rainfall is greater than or equal to a preset threshold, the processor may obtain a historical first absorption capacity of the soil in the first region during the historical duration, obtain an initial pore water pressure distribution of the first region based on the historical first absorption capacity, designate the initial pore water pressure distribution as an initial value and the historical rainfall as a boundary condition, and calculate the first pore water pressure distribution of the first region at the target duration based on the one-dimensional infiltration model.

The preset threshold refers to a critical value for determining whether the historical rainfall is sufficient to bring the soil into the wet state. For example, if the historical rainfall is greater than or equal to the preset threshold, the soil may be determined to be in the wet state.

The one-dimensional infiltration model refers to a simplified mathematical model for studying fluid flow in a porous medium (e.g., soil, rock) in a single direction (e.g., vertically or horizontally). The one-dimensional infiltration models may be used to calculate pore water pressure distributions.

In some embodiments, the processor may generate the first safety factor of the first region during the future duration based on the predicted rainfall and the first pore water pressure distribution using the one-dimensional infiltration model prediction. The first safety factor exists in each first region, and the processor may designate the average of all the first safety factors as the final safety factor of the slope and compare the final safety factor with a preset safety threshold. In response to determining that the final safety factor is less than the preset safety threshold, the processor may determine that there is a hidden danger of landslide for the slope, locate all the first regions, and perform advanced repair processing for the first safety factor of each region.

The preset safety threshold refers to a critical value for determining whether the hidden danger of the landslide exists based on the final safety factor. The preset safety threshold may be set based on the actual condition of the slope.

In some embodiments, generating the first safety factor of the first region during the future duration includes in response to determining that the predicted rainfall during the future duration is greater than a fifth threshold, designating the first pore water pressure distribution as an initial value and the predicted rainfall as a boundary condition, predicting a second pore water pressure distribution of the soil during the future duration based on a one-dimensional infiltration model; obtaining a second pore water pressure of the soil in the first region based on the second pore water pressure distribution; calculating an effective stress of the soil in the first region based on the second pore water pressure, where the effective stress is a difference between a total stress of the soil in the first region and the second pore water pressure; and obtaining a shear strength of the soil under the second pore water pressure and designating a ratio of the shear strength to the effective stress as the first safety factor of the first region during the future duration.

The fifth threshold refers to a critical value used to determine whether the predicted rainfall during the future duration significantly affects the pore water pressure of the soil, which may be determined by a professional technician based on the state of the soil on the slope.

The second pore water pressure distribution refers to a spatial distribution of the pore water pressure in the slope soil during the future duration, which is calculated based on the predicted rainfall.

The effective stress refers to a difference between the total soil stress and the pore water pressure.

The shear strength refers to the ability of the soil to resist shear deformation.

In some embodiments, the processor may obtain the predicted rainfall for the future duration and compare the predicted rainfall with the preset fifth threshold. In response to determining that the predicted rainfall is greater than the fifth threshold, indicating that a large amount of water may infiltrate into the soil, affecting the slope stability, the processor may use the one-dimensional infiltration model to predict the pore water pressure distribution of the soil at the future duration with the current pore water pressure distribution as the initial value and the predicted rainfall as the boundary condition. The processor may calculate the effective stress of the soil in the first region based on the predicted pore water pressure distribution, obtain the shear strength of the soil based on a known second pore water pressure, and designate the ratio of the shear strength of the soil to the effective stress as the first safety factor at the predicted future duration.

In some embodiments of the present disclosure, by predicting the first safety factor during the future duration, a potential risk of slope destabilization may be detected in advance, providing a window of time to take preventive measures.

In the embodiment of the present disclosure, the digital twin model of the slope is created based on the historical point cloud data, which may accurately reflect the initial state of the slope, providing a reliable baseline for the whole process of analysis. By dividing the digital twin model into independent units through grid division and calculating the displacement change value of each grid, the hidden danger area may be precisely localized. By dividing the target duration into a plurality of first durations, matching the preset rainfall pattern and calculating the representative rainfall, and learning the historical rainfall trend through the neural network model, the prediction accuracy of the future rainfall pattern and the amount of rainfall may be improved. By combining the historical rainfall and the predicted rainfall, calculating the pore water pressure distribution through the one-dimensional infiltration model, and generating the local and overall safety factors, the quantitative assessment of the slope stability under the rainfall influence may be realized. Through the above data-driven analysis process, the risk of landslides may be identified, and the hidden areas may be located in advance, providing sufficient response time for the repair of slopes and the prevention of disasters, and reducing the risk of geohazards effectively.

In some embodiments, in response to determining that the final safety factor falls below the preset safety threshold, the processor may generate an emergency drainage power to remotely control at least one set of drainage pumps on the surface of the slope to operate following the emergency drainage power for drainage of the slope.

In some embodiments, the processor may determine the preset safety threshold by looking up in a data retrieval table based on a soil feature and the rainfall feature.

The soil feature refers to the physical, mechanical, and chemical properties of the soil. In some embodiments, the soil feature may include a soil type (e.g., particle composition), a permeability factor, the shear strength, etc. The processor may pre-sample and test the soil in the first region to obtain the soil feature.

The rainfall feature refers to a meteorological parameter that describes rainfall. In some embodiments, the rainfall feature may include a rainfall intensity, a rainfall duration, a rainfall frequency, a spatial distribution, a rain type, or the like. The processor may obtain the rainfall feature through meteorological monitoring data from the weather station.

The data retrieval table may include a plurality of soil features, rainfall features, and corresponding preset safety thresholds. The data retrieval table may be constructed from historical data.

In some embodiments of the present disclosure, determining the preset safety threshold based on the soil feature and the rainfall feature allows for accurate early warning and efficient drainage while reducing unnecessary interventions for maintenance costs.

The emergency drainage power refers to the power of the drainage pump set to address potential safety hazards. In some embodiments, at least one set of drainage pumps may be provided on the surface of the slope. The drainage pumps may remove surface water, rainwater, or seepage water to prevent landslides, erosion, and other hazards of the slope due to increased water pressure or softening of the soil.

In some embodiments, the processor may generate the emergency drainage power in a plurality of ways.

In some embodiments, the processor may determine the emergency drainage power based on a power preset table. The power preset table may include a plurality of final safety factors or differences between the final safety factors and the preset safety threshold, and the corresponding emergency drainage power. The more the final safety factor is below the preset safety threshold, the greater the corresponding emergency drainage power.

In some embodiments of the present disclosure, for the final safety factor below the preset safety threshold, generating an emergency drainage power for preventive measures such as slope drainage may effectively reduce the risk of geohazards.

In some embodiments, the processor may obtain the first safety factor of a plurality of first regions to construct a slope graph and process the slope graph through a slope model to determine the emergency drainage powers for different first regions.

The slope graph refers to a graph that represents a slope condition. In some embodiments, the slope graph may include nodes and edges. Each of the nodes represents the first region, and a node attribute includes the first safety factor of the first region. The edges exist between neighboring first regions, the edges have directions, and the directions of the edges refer to directions of the water flow or directions of the terrain.

In some embodiments, the slope model is a machine learning model. For example, the slope model is a graph neural network (GNN) model, etc.

In some embodiments, an input of the slope model may include the slope graph, and an output of the slope model may include the emergency drainage power for each node.

In some embodiments, the slope model may be obtained by training based on sample data. In some embodiments, the processor may obtain a plurality of second training samples with second labels to constitute a second training sample set. The training process for the slope model is similar to the training process for the prediction model.

In some embodiments, the processor may designate the final safety factor after being drained using the emergency drainage power that rises by a preset percentage or a preset value relative to the pre-drain final safety factor as sample data. The second training sample may include a sample slope graph constructed from the sample data. The second label may be a plurality of emergency drainage powers employed by the sample data.

In some embodiments of the present disclosure, the slope graph is constructed with the first region as the node and water flow or terrain as the direction of the edge, which may transform geospatial relationships into graph structure data to visually express the features of the first region.

In some embodiments, for each first region, the processor may obtain, at a plurality of time points, a plurality of first safety factors of the first region, generate a safety change amplitude based on the plurality of first safety factors, determine the emergency drainage power corresponding to the first region based on the safety change amplitude, and remotely control the at least one set of drainage pumps to operate according to the emergency drainage power.

The safety change magnitude may represent the changing rate of the first safety factor.

In some embodiments, the processor may construct a primary function with time as the independent variable and the first safety factor as the dependent variable and designate the derivative of the function as the safety change magnitude.

In some embodiments, in response to determining that the safety change magnitude is positive, the greater the safety change magnitude, the smaller emergency drain power the processor may determine. In some embodiments, in response to determining that the safety change magnitude is negative, the greater the safety change magnitude, the greater emergency drainage power the processor may determine.

In some embodiments of the present disclosure, the emergency drainage power is determined by the safety change amplitude, which allows efficient drainage. When the safety change amplitude is positive, it indicates that the drainage is effective. The faster the first safety factor rises, the lower the current demand for drainage. At this time, the power may be appropriately lowered to reduce power consumption and avoid the drainage pump idling caused by excessively high drainage power, which results in issues such as motor damage, pump sealing degradation, bearing wear, etc. Reducing the emergency drainage power may also protect the drainage pump. When the safety change amplitude is negative, it indicates that the drainage is getting worse. The faster the safety factor decreases, the higher the current demand for drainage, suggesting a rapid worsening of the situation, so the drainage power needs to be increased to reduce the risk.

In some embodiments, the processor may obtain the first safety factors of the plurality of first regions of the plurality of slopes during the future duration, determine a potential landslide surface based on the first safety factors of the plurality of first regions of the plurality of slopes during the future duration, generate a radar scanning parameter based on the soil feature, control an airborne aperture radar to scan the potential landslide surface under the radar scanning parameter, generate a warning instruction based on a location of a landslide surface in the scanning result, and issue a warning under the warning instruction through a user terminal.

The potential landslide surface refers to a slope where landslides may exist.

In some embodiments, the processor may determine the surface of the slope where the first region with the first safety factor less than a landslide threshold is located as the potential landslide surface. The landslide threshold may be set based on experience.

In some embodiments, the processor may obtain displacement change values at different first grids, calculate a displacement difference of a plurality of neighboring first grids and merge a plurality of grids with displacement differences less than a preset difference threshold, to generate a plurality of variation grids, obtain a difference between the first safety factors of different neighboring variant grids, and determine the potential landslide surface based on the difference.

The displacement difference refers to a value that describes the spatial change rate of a displacement field. In some embodiments, the processor may calculate the difference between the displacement change values of any two neighboring first grids and designate the difference as the displacement difference of the two neighboring first grids.

The preset difference threshold may be preset based on experience. In some embodiments, the operation of merging the plurality of grids with the displacement differences that are less than the preset difference threshold and generating the plurality of variant grids may be performed repeatedly.

In some embodiments, the processor may determine a slope consisting of two variance grids with a difference greater than a variance difference threshold as the potential landslide surface. The variance difference threshold may be set based on experience.

In some embodiments of the present disclosure, generating the variance grid by the displacement difference to determine the potential landslide surface based on the difference may eliminate noise interference by merging grids and accurately locate the potential landslide surface while reducing the amount of calculation.

The radar scanning parameter refers to a parameter that controls the radar to perform a scan. In some embodiments, the radar scanning parameter may include a scanning resolution, a scanning frequency, or the like.

In some embodiments, the processor may determine the radar scanning parameter based on the soil type and the permeability factor in the soil feature, through a scanning parameter table. The scanning parameter table may include the soil type, the permeability factor, and the corresponding radar scanning parameter. The scanning parameter table may be obtained experimentally.

The airborne aperture radar may be provided on a drone or an unmanned vehicle.

The scanning result refers to a location of the landslide surface where a landslide exists in the potential landslide surface. The landslide surface location may be included in the warning instruction.

In some embodiments of the present disclosure, generating the warning instruction by determining the potential landslide surface and the location of the landslide surface allows for an accurate prognosis of the disaster, thereby enhancing the response speed.

In some embodiments, the processor may determine a dewatering location and a dewatering channel depth based on the location of the landslide surface in the scanning result, drive an excavation robot to move to the dewatering location and drive the excavation robot to cut the bucket into the soil layer to excavate a drainage channel corresponding to the dewatering channel depth.

The dewatering location refers to a point where the drainage pumps are deployed. The dewatering location may be the location of the landslide surface, which may be obtained from the scanning result.

The dewatering channel depth refers to a vertical distance from the bottom of the drainage pump to the surface. In some embodiments, the processor may query historical data for the commonly used or most recently excavated dewatering channel depth when the landslide occurs on the landslide surface as the dewatering channel depth. The landslide surface in the historical data is at the same landslide surface as the dewatering location.

The processor may drive the excavation robot to excavate a drainage guide trench corresponding to the dewatering channel depth at the dewatering location to set up the drainage pump.

In some embodiments of the present disclosure, the setting of the drainage pump according to the dewatering location and the dewatering channel depth may accurately match the drainage demand and improve the drainage efficiency of the system.

It should be noted that the foregoing description of the process 100 is for the purpose of exemplification and illustration only and does not limit the scope of application of the present disclosure. For a person skilled in the art, various corrections and changes can be made to the process 100 under the guidance of the present disclosure. However, these corrections and changes remain within the scope of the present disclosure.

Figure 4:
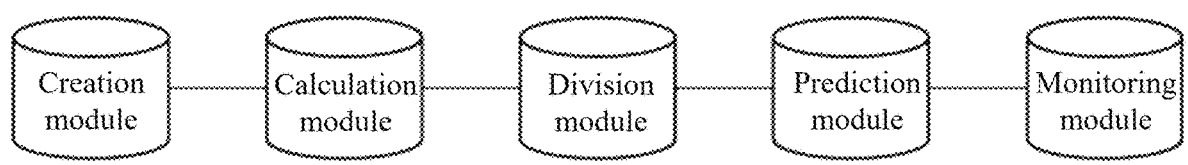
FIG. 4 is a schematic diagram illustrating an exemplary digital twin-based intelligent slope monitoring system according to some embodiments of the present disclosure.

FIG. 4 is a schematic diagram illustrating an exemplary digital twin-based intelligent slope monitoring system according to some embodiments of the present disclosure.

In some embodiments, as shown in FIG. 4, one or more embodiments of the present disclosure provide a digital twin-based intelligent slope monitoring system for realizing the digital twin-based intelligent slope monitoring method. In some embodiments, the digital twin-based intelligent slope monitoring system may include a creation module, a calculation module, a division module, a prediction module, and a monitoring module.

The creation module is configured to obtain the first point cloud data of the surface of the slope at the past preset time point and create the digital twin model based on the first point cloud data.

The calculation module is configured to obtain the second point cloud data of the surface of the slope at the current time point, transform the first point cloud data, the second point cloud data, and the digital twin model into the same coordinate system, perform, based on the preset size, a grid division on the digital twin model to generate a plurality of first grids, define the duration between the past preset time point and the current time point as the target duration, calculate the displacement change value of each first grid among the plurality of first grids during the target duration, and display the displacement change value in the digital twin model.

The division module is configured to define the first grid with the displacement change value greater than a first threshold as a first region, obtain the actual rainfall in the first region during the target duration, establish the first coordinate system with time as the horizontal axis and the actual rainfall as the vertical axis, plot the first change curve of the actual rainfall over time in the first coordinate system, obtain one or more extreme points of the first change curve, define the time point corresponding to each extreme point as the first time point, and divide the target duration into the plurality of first durations with different lengths based on the one or more first time points corresponding to the one or more extreme points.

The prediction module is configured to, for each first duration of the plurality of first durations, set the plurality of rainfall patterns, each rainfall pattern corresponding to the plurality of pieces of historical rainfall data, determine a rainfall pattern from the plurality of rainfall patterns as an optimal pattern based on the actual rainfall during the first duration, obtain the optimal time point within the first duration based on the optimal pattern and the plurality of pieces of historical rainfall data, designate the actual rainfall at the optimal time point as the representative rainfall during the first duration, construct a prediction model based on the historical rainfall data, predict the optimal pattern and representative rainfall for the future duration based on the optimal pattern and representative rainfall of the first duration, and define the representative rainfall during the future duration as the predicted rainfall.

The monitoring module is configured to obtain a historical rainfall during the target duration, obtain the first pore water pressure distribution of soil in the first region based on the historical rainfall, generate the first safety factor of the first region during the future duration based on the predicted rainfall and the first pore water pressure distribution, designate the average of all first safety factors of the slope as the final safety factor of the slope, and display the final safety factor of the slope in the digital twin model.

More descriptions regarding each of the modules may be found in FIGS. 1-3 and related descriptions thereof.

It should be understood that the system shown in FIG. 4 and its modules may be implemented utilizing a variety of approaches. For example, in some embodiments, the digital twin-based intelligent slope monitoring system and its modules may be implemented via the processor.

It should to be noted that, the above description of the digital twin-based intelligent slope monitoring system and its modules are provided only for descriptive convenience, and does not limit the present disclosure to the scope of the cited embodiments. It is to be understood that for a person skilled in the art, after understanding the principle of the system, it may be possible to arbitrarily combine individual modules or form a subsystem to connect with other modules without departing from this principle. In some embodiments, the creation module, the calculation module, the division module, the prediction module, and the monitoring module disclosed in FIG. 4 may be different modules in a system, or a single module realizing two or more of the above functions. For example, each module may share a common storage module, and each module may have a respective storage module. Morphs such as these are within the scope of protection of the present disclosure.

One or more embodiments of the present disclosure provide a non-transitory computer-readable storage medium storing computer instructions. When the computer reads the computer instructions in the storage medium, the computer executes the digital twin-based intelligent slope monitoring method as described in any of the embodiments of the present disclosure.

One or more embodiments of the present disclosure further provide a digital twin-based intelligent slope monitoring device, including at least one processor and at least one memory. The at least one memory is configured to store computer instructions, and the at least one processor is configured to execute at least a portion of the computer instructions to implement the digital twin-based intelligent slope monitoring method as described in any of the embodiments of the present disclosure.

It should be understood that although the individual steps in the flowcharts of the embodiments of the present disclosure are shown in sequence as indicated by the arrows, the steps are not necessarily executed in sequence as indicated by the arrows. Unless expressly stated herein, there is no strict order limitation on the execution of these steps, and the steps may be executed in some other order. Moreover, at least some of the steps in the embodiments may include a plurality of sub-steps or a plurality of phases, and these sub-steps or phases are not necessarily executed to completion at the same moment, but may be executed at different moments. These sub-steps or phases are also not necessarily executed sequentially, but may be executed in turn or alternately with other steps, or at least a portion of sub-steps or phases of other steps.

A person of ordinary skill in the art may understand that all or part of the processes in the methods of the above-described embodiments may be accomplished by instructing the relevant hardware through a computer program, and that the above-described program may be stored in a non-volatile computer-readable storage medium, which program, when executed, may include processes such as those of the various embodiments of the methods described above. Any references to a memory, storage, database, or other medium used in the various embodiments provided herein may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), synchlink DRAM (SLDRAM), direct Rambus RDRAM (RDRAM), dynamic RDRAM (DRDRAM), and memory bus RDRAM.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment", "one embodiment", or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about", "approximate", or "substantially". For example, "about", "approximate", or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A digital twin-based intelligent slope monitoring method, comprising:
    obtaining first point cloud data of a surface of a slope at a past preset time point and creating a digital twin model based on the first point cloud data;
    obtaining second point cloud data of the surface of the slope at a current time point, transforming the first point cloud data, the second point cloud data, and the digital twin model into a same coordinate system, performing, based on a preset size, a grid division on the digital twin model to generate a plurality of first grids, defining a duration between the past preset time point and the current time point as a target duration, calculating a displacement change value of each first grid among the plurality of first grids during the target duration, and displaying the displacement change value in the digital twin model;
    defining the first grid with a displacement change value greater than a first threshold as a first region, obtaining an actual rainfall in the first region during the target duration, establishing a first coordinate system with time as a horizontal axis and the actual rainfall as a vertical axis, plotting a first change curve of the actual rainfall over time in the first coordinate system, obtaining one or more extreme points of the first change curve, for each extreme point, defining a time point corresponding to the extreme point as a first time point, and dividing the target duration into a plurality of first durations with different lengths based on the one or more first time points corresponding to the one or more extreme points;
    for each first duration of the plurality of first durations, setting a plurality of rainfall patterns, each rainfall pattern corresponding to a plurality of pieces of historical rainfall data, determining a rainfall pattern from the plurality of rainfall patterns as an optimal pattern based on the actual rainfall during the first duration, obtaining an optimal time point within the first duration based on the optimal pattern and the plurality of pieces of historical rainfall data, designating the actual rainfall at the optimal time point as a representative rainfall during the first duration, constructing a prediction model based on the historical rainfall data corresponding to the plurality of first durations, predicting an optimal pattern and a representative rainfall for a future duration based on the optimal pattern and representative rainfall of the first duration, and defining the representative rainfall during the future duration as a predicted rainfall; and
    obtaining a historical rainfall during the target duration, obtaining a first pore water pressure distribution of soil in the first region based on the historical rainfall, generating a first safety factor of the first region during the future duration based on the predicted rainfall and the first pore water pressure distribution, designating an average of all first safety factors of the slope as a final safety factor of the slope, and displaying the final safety factor of the slope in the digital twin model.

2. The method of claim 1, wherein the calculating a displacement change value of each first grid among the plurality of first grids includes:
    defining a vertex of the first grid in the digital twin model as a first node, and defining a transformed three-dimensional position coordinate of the first point cloud data and a transformed three-dimensional position coordinate of the second point cloud data as a first position coordinate and a second position coordinate, respectively;
    obtaining a first quantity of the first point cloud data and a second quantity of the second point cloud data within the first grid;
    in response to determining that the first quantity and the second quantity are both less than or equal to 1, defining a vector with the first node as a starting point and the first position coordinate of the first point cloud data as an endpoint as a first vector, and defining a vector with the first node as the starting point and the second position coordinate of the second point cloud data as an endpoint as a second vector;
    in response to determining that the first quantity is greater than 1, calculating a centroid coordinate of all first point cloud data within the first grid, and designating a vector with the first node as the starting point and the centroid coordinate of the first point cloud data as an endpoint as the first vector; in response to determining that the second quantity is greater than 1, calculating a centroid coordinate of all second point cloud data within the first grid, and designating a vector with the first node as the starting point and the centroid coordinate of the second point cloud data as an endpoint as the second vector;
    obtaining a unit vector $r_i$ of the first grid in a normal direction;

calculating a first component $u_1$ and a second component $u_2$ of the first vector and the second vector in the normal direction based on a first equation and a second equation, respectively, wherein the first equation is $u_1=(d_1 \cdot r_i)r_i$, and the second equation is $u_2=(d_2 \cdot r_i)r_i$, $d_1$ and $d_2$ denote the first vector and the second vector, respectively; and defining a difference between the first component and the second component as the displacement change value of the first grid.

3. The method of claim 1, wherein the determining a rainfall pattern from the plurality of rainfall patterns as an optimal pattern includes:

calculating an average of actual rainfalls at a plurality of first time points on the first change curve;

in response to determining that the first duration is greater than a second threshold, the average is greater than a third threshold, and the first time points are maximum points, matching the optimal pattern as a first pattern;

in response to determining that the first duration is greater than the second threshold, the average is less than the third threshold, and the first time points are minimum points, matching the optimal pattern as a second pattern;

in response to determining that the first duration is less than the second threshold, the average is greater than the third threshold, and the first time points are maximum points, matching the optimal pattern as a third pattern; and in response to determining that the first duration is less than the second threshold, the average is less than the third threshold, and the first time points are minimum points, matching the optimal pattern as a fourth pattern.

4. The method of claim 3, wherein the obtaining an optimal time point within the first duration includes:

obtaining an average rainfall of the plurality of pieces of historical rainfall data corresponding to the optimal pattern at the first time points; and calculating a difference between the actual rainfall at each first time point and the average rainfall and defining a time point where the difference is less than or equal to a fourth threshold as the optimal time point.

5. The method of claim 3, wherein the constructing a prediction model includes:

for each piece of historical rainfall data,
defining a time period corresponding to the piece of historical rainfall data as a historical duration, dividing the historical duration into a plurality of first durations, matching a corresponding optimal pattern for each first duration, and calculating the representative rainfall under the optimal pattern; and determining a division point within the historical duration, designating the optimal pattern and the representative rainfall of each first duration before the division point as input features, selecting one first duration after the division point, and designating the optimal pattern and the representative rainfall of the first duration after the division point as output features, repeating the operations on each historical rainfall data to construct a neural network model, and obtaining the prediction model by training the neural network model based on the input features and the output features of each piece of historical rainfall data.

6. The method of claim 1, wherein the generating a first safety factor of the first region during the future duration includes:

in response to determining that the predicted rainfall during the future duration is greater than a fifth threshold, designating the first pore water pressure distribution as an initial value and the predicted rainfall as a boundary condition, predicting a second pore water pressure distribution of the soil during the future duration based on a one-dimensional infiltration model;

obtaining a second pore water pressure of the soil in the first region based on the second pore water pressure distribution;

calculating an effective stress of the soil in the first region based on the second pore water pressure, wherein the effective stress is a difference between a total stress of the soil in the first region and the second pore water pressure; and obtaining a shear strength of the soil under the second pore water pressure and designating a ratio of the shear strength to the effective stress as the first safety factor of the first region during the future duration.

7. A digital twin-based intelligent slope monitoring system for implementing the digital twin-based intelligent slope monitoring method of claim 1, comprising:

a creation module, configured to obtain first point cloud data of a surface of a slope at a past preset time point and create a digital twin model based on the first point cloud data;

a calculation module, configured to obtain second point cloud data of the surface of the slope at a current time point, transform the first point cloud data, the second point cloud data, and the digital twin model into a same coordinate system, perform, based on a preset size, a grid division on the digital twin model to generate a plurality of first grids, define a duration between the past preset time point and the current time point as a target duration, calculate a displacement change value of each first grid among the plurality of first grids during the target duration, and display the displacement change value in the digital twin model;

a division module, configured to define the first grid with a displacement change value greater than a first threshold as a first region, obtain an actual rainfall in the first region during the target duration, establish a first coordinate system with time as a horizontal axis and the actual rainfall as a vertical axis, plot a first change curve of the actual rainfall over time in the first coordinate system, obtain one or more extreme points of the first change curve, define a time point corresponding to each extreme point as a first time point, and divide the target duration into a plurality of first durations with different length based on the one or more first time point corresponding to the one or more extreme points;

a prediction module, configured to, for each first duration of the plurality of first durations, set a plurality of rainfall patterns, each rainfall pattern corresponding to a plurality of pieces of historical rainfall data, determine a rainfall pattern from the plurality of rainfall patterns as an optimal pattern based on the actual rainfall during the first duration, obtain an optimal time point within the first duration based on the optimal pattern and the plurality of pieces of historical rainfall data, designate the actual rainfall at the optimal time point as a representative rainfall during the first duration, construct a prediction model based on the historical rainfall data, predict an optimal pattern and a representative rainfall for a future duration based on the optimal pattern and representative rainfall of the first duration, and define the representative rainfall during the future duration as a predicted rainfall; and a monitoring module, configured to obtain a historical rainfall during the target duration, obtain a first pore water pressure distribution of soil in the first region based on the historical rainfall, generate a first safety factor of the first region during the future duration based on the predicted rainfall and the first pore water pressure distribution, designate an average of all first safety factors of the slope as a final safety factor of the slope, and display the final safety factor of the slope in the digital twin model.

8. A non-transitory computer storage medium storing program instructions, wherein the program instructions, when executed, control the non-transitory computer storage medium to perform the digital twin-based intelligent slope monitoring method of claim 1 in a device.

\* \* \* \* \*